(12) United States Patent
Jiang et al.

(10) Patent No.: US 11,037,029 B2
(45) Date of Patent: Jun. 15, 2021

(54) MULTI-STAGE IMAGE RECOGNITION FOR A NON-IDEAL ENVIRONMENT

(71) Applicant: Futurewei Technologies, Inc., Plano, TX (US)

(72) Inventors: Wei Jiang, Santa Clara, CA (US); Wei Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 69 days.

(21) Appl. No.: 16/157,983

(22) Filed: Oct. 11, 2018

(65) Prior Publication Data

US 2020/0117954 A1    Apr. 16, 2020

(51) Int. Cl.
*G06K 9/62* (2006.01)
*G06N 3/08* (2006.01)
*G06N 3/04* (2006.01)

(52) U.S. Cl.
CPC ......... *G06K 9/6262* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,792,530 | B1 * | 10/2017 | Wu | G06K 9/6219 |
| 9,928,448 | B1 * | 3/2018 | Merler | G06K 9/6285 |
| 10,019,506 | B1 * | 7/2018 | Li | G06K 9/6267 |
| 10,235,601 | B1 * | 3/2019 | Wrenninge | G06K 9/6256 |
| 2017/0124415 | A1 * | 5/2017 | Choi | G06N 3/08 |
| 2018/0137551 | A1 * | 5/2018 | Zheng | G06F 16/532 |
| 2018/0342069 | A1 * | 11/2018 | Lim | G06T 7/0008 |
| 2019/0251612 | A1 * | 8/2019 | Fang | G06F 16/535 |
| 2020/0005087 | A1 * | 1/2020 | Sewak | G06K 9/6262 |

OTHER PUBLICATIONS

Kawano, Y., et al., "Automatic expansion of a food image dataset leveraging existing categories with domain adaptation," ECCV Workshop on Transferring and Adapting Source Knowledge in Computer Vision, 2014, 16 pages.
Mezgec, S., et al., "NutriNet: A deep learning food and drink image recognition system for dietary assessment," Nutrients, 2017, 19 pages.
Pandey, P., et al., "FoodNet: Recognizing food using ensemble of deep networks," IEEE Signal Processing Letters, Sep. 27, 2017, 5 pages.
Redmon, J., et al., "YOLO9000: Better, Faster, Stronger", CVPR 2017, Dec. 25, 2016, 9 pages.
Ren, S., et al., "Faster r-cnn: Towards read-time object detection with region proposal networks", NIPS, Jan. 6, 2016, 14 pages.
He, K., et al., "Deep residual learning for image recognition", CVPR, 2016, 9 pages.

* cited by examiner

*Primary Examiner* — David Bilodeau
(74) *Attorney, Agent, or Firm* — Conley Rose, P.C.

(57) ABSTRACT

Provided are an apparatus and a method of multi-stage image recognition. For the multi-stage image recognition, categorized object data is received from a first deep neural network. A second deep neural network is trained on sub-category customization data that relates to a non-ideal environment when the second deep neural network produces invalid subcategorized object data from the categorized object data, and generates an image recognition result using the second deep neural network as trained.

13 Claims, 8 Drawing Sheets

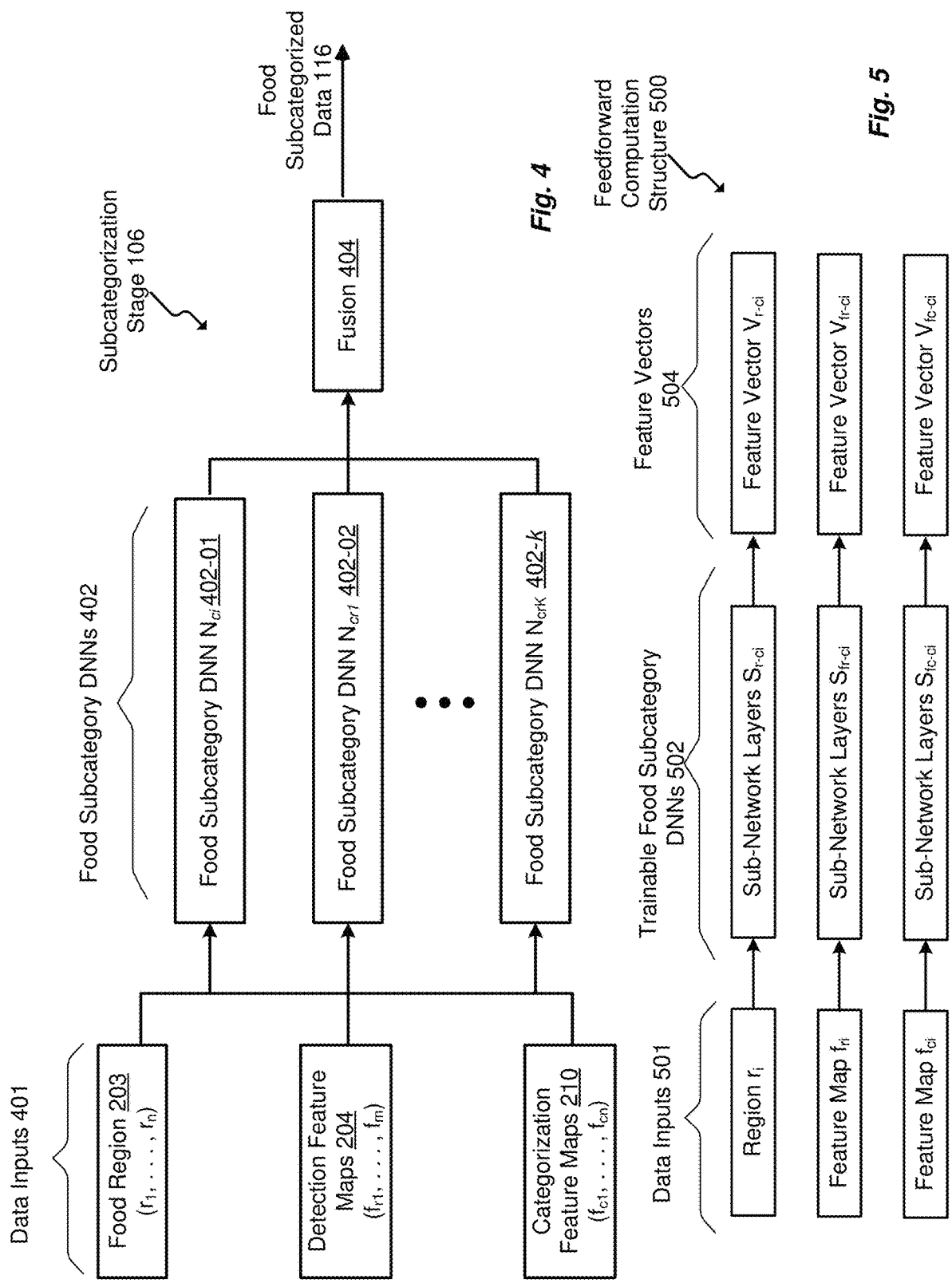

MULTI-STAGE IMAGE RECOGNITION FOR A NON-IDEAL ENVIRONMENT

STATEMENT REGARDING FEDERALLY SPONSORED RESEARCH OR DEVELOPMENT

Not applicable.

REFERENCE TO A MICROFICHE APPENDIX

Not applicable.

BACKGROUND

Image recognition, in the context of machine vision, is the ability of software to identify objects, places, people, writing, and actions in images. Computers have used machine vision technologies in combination with a camera and artificial intelligence software to achieve image recognition results for captured images.

Though the human brain can easily recognize objects, computers have difficulty with the task, generally using deep machine learning techniques, where performance has been suitable on convolutional neural net processors due to the massive amounts of power for its computationally intensive nature.

Generally, image recognition training has relied on data mining of smart photo libraries, targeted advertising, the interactivity of media, accessibility for the visually impaired and enhanced research capabilities.

SUMMARY

In an embodiment, the disclosure includes a method of multi-stage image recognition. The method includes receiving categorized object data from a first deep neural network, training a second deep neural network based on subcategory customization data that relates to a non-ideal environment when the second deep neural network produces invalid subcategorized object data from the categorized object data; and generating an image recognition result using the second deep neural network as trained. Optionally, in any of the preceding aspects, another implementation of the aspect provides that training the second deep neural network based on subcategory customization data includes receiving user subcategory input relating to categorized object data, receiving ambient environment data relating to non-ideal image data, and training a third deep neural network based on the user subcategory input and the ambient environment data to produce a plurality of subcategories. Optionally, in any of the preceding aspects, another implementation of the aspect provides that the first deep neural network is trained on stock image data. Optionally, in any of the preceding aspects, another implementation of the aspect further provides further subcategorizing, by the second deep neural network, the categorized object data with one of a plurality of subcategories to produce subcategorized object data, and providing the subcategorized object data to produce the image recognition result. Optionally, in any of the preceding aspects, another implementation of the aspect provides that the categorized object data is based on non-ideal image data from at least one of a digital camera, a handheld mobile device, a surveillance device, or an artificial intelligence device. Optionally, in any of the preceding aspects, another implementation of the aspect provides that the ambient environment data includes at least one of ambient lighting data, ambient humidity data; or time-of-day data.

In an embodiment, the disclosure includes a method of image recognition. The method includes receiving non-ideal image data, detecting, by a first deep neural network, an object from the non-ideal image data to produce detected object data, categorizing, by a second deep neural network, the detected object data with one of a plurality of categories to produce categorized object data, and training a third deep neural network based on subcategory customization data relating to a personalized user environment when the third deep neural network produces invalid subcategorized object data from the categorized object data for generating an image recognition result.

Optionally, in any of the preceding aspects, another implementation of the aspect provides that training the third deep neural network based on subcategory customization data includes receiving user subcategory input relating to the non-ideal image data, receiving ambient environment data relating to the non-ideal image data, and training the third deep neural network based on the user subcategory input and the ambient environment data to produce a plurality of subcategories. Optionally, in any of the preceding aspects, another implementation of the aspect provides that the first and the second deep neural networks are trained on stock image data. Optionally, in any of the preceding aspects, another implementation of the aspect further provides subcategorizing, by the third deep neural network, the categorized object data with one of a plurality of subcategories to produce valid subcategorized object data, and providing the valid subcategorized object data to produce an image recognition result. Optionally, in any of the preceding aspects, another implementation of the aspect provides the plurality of categories is a plurality of coarse-grained categories. Optionally, in any of the preceding aspects, another implementation of the aspect provides the plurality of subcategories is a plurality of fine-grained subcategories. Optionally, in any of the preceding aspects, another implementation of the aspect provides the categorized object data is based on the non-ideal image data from at least one of a digital camera, a handheld mobile device, a surveillance device; or an artificial intelligence device. Optionally, in any of the preceding aspects, another implementation of the aspect provides the ambient environment data includes at least one of ambient lighting data, ambient humidity data, or time-of-day data.

In an embodiment, the disclosure includes an apparatus for multi-stage image recognition. The apparatus includes a processor, and memory coupled to the processor. The memory for storing instructions that, when executed, cause the processor to receive categorized object data from a first deep neural network, and train a second deep neural network based on subcategory customization data relating to a personalized user environment when the second deep neural network produces invalid subcategorized object data from the categorized object data for generating an image recognition result.

Optionally, in any of the preceding aspects, another implementation of the aspect provides that the memory stores further instructions that, when executed, cause the processor to train the second deep neural network based on subcategory customization data by receiving user subcategory input relating to non-ideal image data, receiving ambient environment data relating to the non-ideal image data, and training a third deep neural network based on the user subcategory input and the ambient environment data to produce a plurality of subcategories. Optionally, in any of the preceding aspects, another implementation of the aspect provides that the first deep neural network is trained on stock image data. Optionally, in any of the preceding aspects, another implementation of the aspect provides that the memory stores further instructions that, when executed, cause the processor to subcategorize, by the second deep neural network, the categorized object data with one of a plurality of subcategories to produce valid subcategorized object data, and provide the valid subcategorized object data to produce the image recognition result. Optionally, in any of the preceding aspects, another implementation of the aspect provides that the categorized object data is based on non-ideal image data from at least one of a digital camera, a handheld mobile device, a surveillance device, or an artificial intelligence device. Optionally, in any of the preceding aspects, another implementation of the aspect provides that the ambient environment data comprises at least one of ambient lighting data, ambient humidity data, or time-of-day data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4 and 5 illustrate a functional operation of an embodiment of a subcategorization stage of the DNN framework.

DETAILED DESCRIPTION

Figure 1:
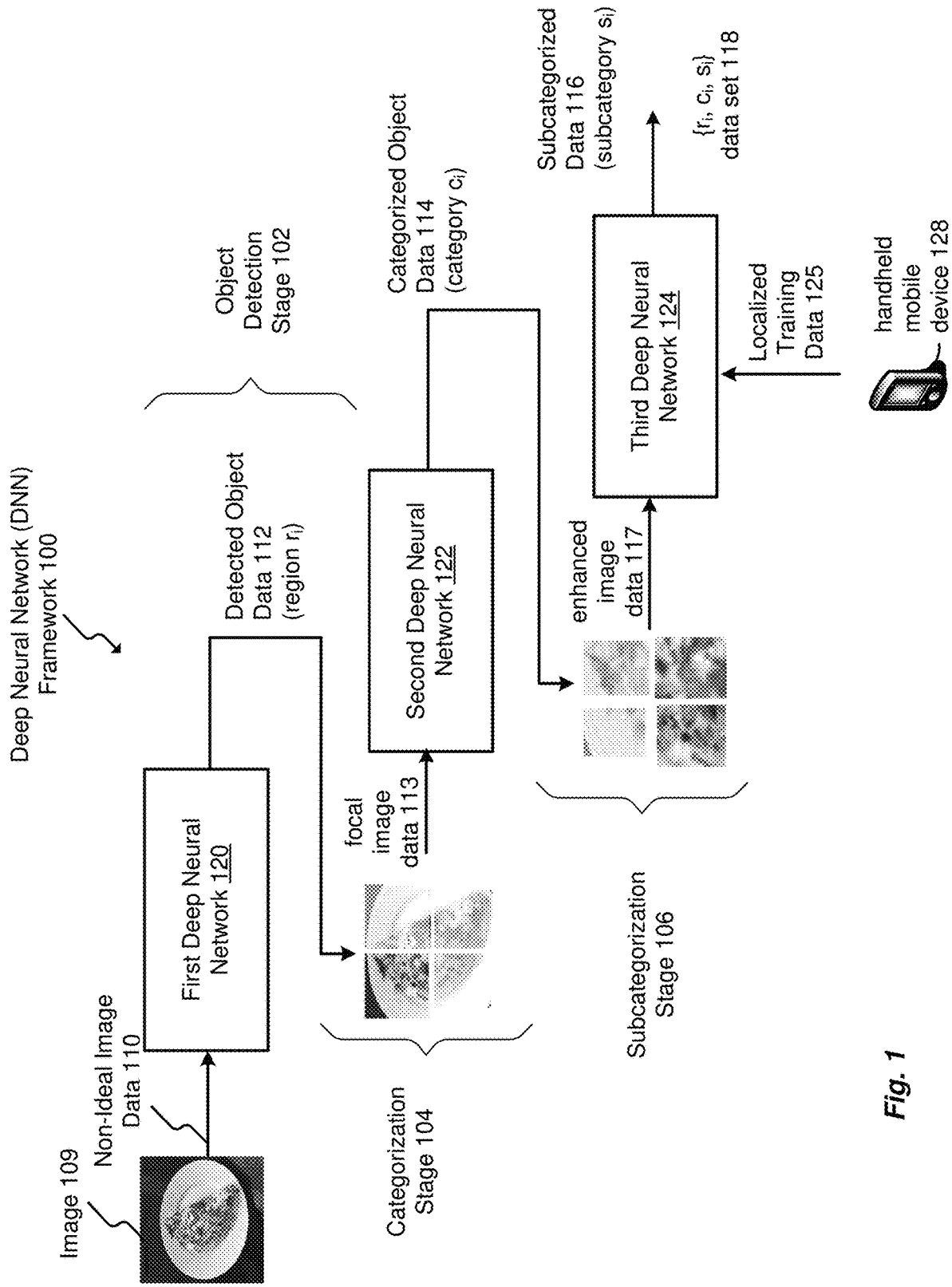
FIG. 1 is an embodiment of a multi-stage end-to-end deep neural network (DNN) framework.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Artificial intelligence and machine learning have been used in applications that may be taken for granted. For example, mobile checking deposit through a smart phone relies on artificial intelligence and machine learning to decipher and convert handwriting on checks into text via optical code recognition (OCR). Social networking sites, such as Facebook, may use artificial intelligence to recognize faces in photos a user uploads to their social media walls. As another example, Facebook has used artificial intelligence to personalize newsfeeds and to ensure that a user sees Facebook posts of interest.

Another function that has been gaining interest is the use of artificial intelligence and/or machine learning in applications that can implement deep neural networks (DNN) to recognize the type of food served in a home or institutional environment. The use of artificial intelligence in prepared food identification can be used for dietary assessment and management, health monitoring, etc. Food category recognition has been available based on large-scale, publically available, web images that can implement various types of image classification based on deep neural networks.

However, it is non-trivial to apply image recognition to specific non-ideal environments such as homes, hospitals, schools, etc., because of (1) a localization issue, (2) a personalization issue, and (3) a scalability issue.

The localization issue relates to detection of an object in the non-ideal environment. For example, promotional captured images, such as food images captured in a controlled environment for posting by restaurants, web users, etc., can differ from day-to-day food images captured in a home environment. Though image classification of promotional objects may be sufficient from large-scale, publically available web images used to train a DNN because of professionally prepared images, those images captured by robots or surveillance cameras in a non-ideal environment are not well lit or staged. For example, images of food will not be well-centered, have poor lighting, likely have poor image resolution, and may be a small region of the overall captured image.

The personalization issue related to an object created by one user may differ from the same object created by another. In a food context, each home cook can create the same dish from the same recipe differently. Nuances from household-to-household can cause the dishes to be unrecognizable to the other household, causing a barrier to the use of artificial intelligence. To address the personalization issue, a DNN needs to have an ability to readily learn to detect and recognize food in particular non-ideal environments with limited training input. In contrast to promotional images in which a large amount of training data can be available to train a general food category classifier, such as dumplings, pizza, omelets, etc., homemade foods can be quite different from the web-trained idealized versions.

The scalability issue also affects the usefulness of artificial intelligence in dietary assessment and health monitoring because recognizing food categories, such as pizza and sandwiches, calls upon the need to assign food subcategories. For example, though a food object is identified, such as a pizza, subcategorization is needed for nutritional assessment applications. For example, subcategories for a pizza may include a pan pizza, a thick crust pizza, a large, medium or small pizza, or can be based on different pizza toppings, etc.

One way to perhaps overcome the scalability issue is to treat each subcategory food type as a singular category. For example, instead of recognizing the pizza category, the deep neural network can be trained to recognize meat lover pizza, veggie delight pizza, etc. at the category level. This approach, however, is not scalable because there can be thousands of food subcategory-levels. The resulting DNN becomes excessively complex for distinguishing such a category of subcategories, and an unreasonable amount of training data would be called upon to train such a complicated neural network.

Disclosed herein is an object detection and recognition system for personalized and subcategory objects in a non-ideal user environment, in which data specific to the non-ideal user environment can be used to train the personalized and subcategory object recognition stage for a deep neural network framework having an increasingly granular capability with each subsequent level or stage of a deep neural network.

FIG. 1 is an embodiment of a multi-stage end-to-end deep neural network (DNN) framework 100. In the example of FIG. 1, image recognition may be depicted as a deep neural network flow of increasing granularity through a first DNN 120 having a coarse-level granularity for object detection, a second DNN 122 having a moderate-level granularity for categorization of a detected object, and a third DNN 124 having a fine-level granularity for subcategorization of the categorized object. Accordingly, the DNN framework 100 may generate a data set 118 for an object including detected object data 112, categorized object data 114, and subcategorized data 116. The data set 118 can be represented as $\{r_i, c_i, s_i\}$, where $r_i$ relates to a region of a detected food item, $c_i$ relates to a category of the region $r_i$ and $s_i$ relates to a subcategory of the category $c_i$.

Each of the first DNN 120, the second DNN 122, and the third DNN 124 may be based on a convolutional neural network structure. A convolutional neural network structure includes a plurality of neurons with learnable weights and biases. Each neuron can receive several inputs, take a weighted sum over the inputs via convolution filters, and pass the inputs through an activation or feature map used by a fully-connected neural layer to produce an output data vector or data value. Granularity increases with each respective staged DNN 120, 122, and 124. As may be appreciated, each DNN 120, 122, and 124 may include a convolutional neural network structure generally including a convolutional layer, a pooling layer, and a fully-connected neural layer.

As may be appreciated, inputs to a DNN may be referred to as a vector input based on a multi-channeled image. For example, the non-ideal image data 110 of an image 109 may include a pixel height of 32, a pixel width of 32, and pixel depth of 3, where one pixel is for a red channel, one pixel is for a green channel, and one pixel is for a blue channel.

In the example of when a DNN includes a convolutional neural network, convolutional layers can be understood to be defined as a mathematical operation on a first function by a second function to produce a third function. The third function expresses how the shape of the first function is modified by the second function. The term convolution may refer to both the resulting third function and to the process of computing the third function.

In relation to a DNN, the first function may be considered the input to the DNN, such as the non-ideal image data 110. The second function may be considered a filter, such as a 5-pixel by 5-pixel by 3-pixel filter. The filter can be slid over the image 109 of the 32-pixel×32-pixel×3-pixel image, where the result is a singular number being the result of taking a dot product between the filter, or second function, against a 5-pixel by 5-pixel by 3-pixel portion of the image 109, which is a 75-dimensional (5*5*3) dot product value. In this example, the convolutional result is a 28 by 28 by 1 convolutional from all spatial locations of the input. The third function, the convolutional result, may be referred to as a feature map(s). The filters, or second functions, can be initialized randomly and become the parameters to be learned by the DNN for image recognition results.

A pooling layer for a DNN may be understood to progressively reduce the spatial size of the representation of the convolution layer or layers to reduce the amount of parameters and computation of a DNN 120, 122, and 124. A fully connected layer may be understood to be the fully connected layer of neurons at the end of the DNN 120, 122, and 124. Neurons in a fully connected layer have full connections to all feature maps of the previous layer to produce a prediction of the detected object data 112 of the first DNN 120, the categorized object data 114 of the second DNN 122, or the subcategorized data 116 of the third DNN 124.

The object detection stage 102 can be pre-trained with a training data from an ideal environment. Ideal training data can be obtained from publically-available image data sources. Examples of image data sources can include catalogues, menus, books, etc. For example, the object of the non-ideal image data 110 can be defined in the context of a food object served on a plate. The first DNN 120 may operate to produce detected object data 112 from the non-ideal image data 110. The detected object data 112 may indicate a region such as a region $r_i$ of the non-ideal image data 110 that can be provided to the categorization stage 104. In a simplified food context, the detected object data 112 may indicate the region $r_i$ of a detected "food" region of the non-ideal image data 110.

The categorization stage 104, via the second DNN 122, can be configured to recognize category-level food types, such as a pizza category, an omelet category, a chicken wings category, etc. Training data can be based on large amounts of publicly-available training data directed to a set of pre-defined popular food categories that are common for deployment of the DNN framework 100, such as homes, institutional environments, or localized/cultural food preferences in certain geographic regions.

For each food category of the categorization stage 104, the second DNN 122 classifies a food object from the detected object data 112 with respect to focal data 113. For example, an omelet category, a pizza category, etc. In an embodiment, DNN 122 receives focal data 113 that acts a virtual magnification of a portion or portions of the non-ideal image data and outputs the categorized object data 114, which is from a fully connected layer of the DNN 122 having full connections to all activations, or outputs, of the object detection stage 102. For an example in a food context, the categorization object data 114 is produced from the detected object data 112, such as an omelet category, a pizza category, etc.

For use in non-ideal locations, the subcategorization stage 106 can be trained based on localized training data 125 relating to the non-ideal user environment. In effect, the DNN framework 100 can be tuned to a non-ideal user environment through the third DNN 124.

The third DNN 124 of subcategorization stage 106 operates to generate subcategorized data 116 from enhanced image data 117 based on the focal image data 113 of the categorization stage 104, which also may include personalized and subcategory recognition data from the categorized object data 114. The enhanced image data 117 has a higher granularity as contrasted with the focal image data 113, and further with regard to the non-ideal image data 110. The third DNN 124 can be trained to recognize food specifics with fine granularity from categorized object data 114 produced by the second DNN 122. The third DNN 124 can operate to distinguish between a plurality of different types of a particular food, e.g., vegetable omelet, western omelet, cheese omelet, and so on through a final subcategory of omelet. In an embodiment, the subcategorized data 116 may indicate a value such as a subcategory $s_i$ of the categorized object data 114 that can be provided as a data set 118. In a simplified food context, the subcategorized data 116 indicates the subcategory $s_i$ of the categorized object data 114 as being likely a "subcategory" of "vegetable" omelet, "western" omelet, "cheese" omelet, etc.

For example, localized training data 125 can be received from a user via a graphic user interface of the handheld mobile device 128, as well as from sensor data generated by internal sensors devices of the handheld mobile device 128 relating to environmental conditions such as light level data, geolocation data, etc. Localized training of the third DNN 124 is described in detail with reference to FIG. 6.

Initial parameters of the third DNN 124 can be pre-trained to distinguish common food subcategories that relate to certain geographic regions and cultural influence. After deployment to a location, whether a residence, an institutional facility such as a school, hospital, elder care facility, etc., the parameters of the convolutional filter, or second function, of the third DNN 124 can be fine-tuned to better accommodate subcategory food recognition in the specific non-ideal user environment by a user through an application executing on a handheld mobile device 128 to produce localized training data 125. Also, when new personalized food may be introduced to the food category, the subcategorization stage 106 can be fine-turned or re-trained. In any case, only the DNN framework 100 is fine-tuned or re-trained to cover new personalized foods. The resulting solution may provide a flexible and scalable alternative to straightforward application of existing category food recognition methods across a unitary machine-learning (ML) structure. Such training is described in detail with reference to FIG. 6.

In operation, the DNN framework 100 processes non-ideal image data 110 in an end-to-end manner. The detected object data 112 can be produced from the non-ideal image data 110 by the first DNN 120. The detected object data 112 can be used as the input to the categorization stage 104 to produce categorized object data 114 via the second DNN 122. The categorized object data 114 can then be used as the input to the third DNN 124 to produce the subcategorized data 116.

Figure 2:
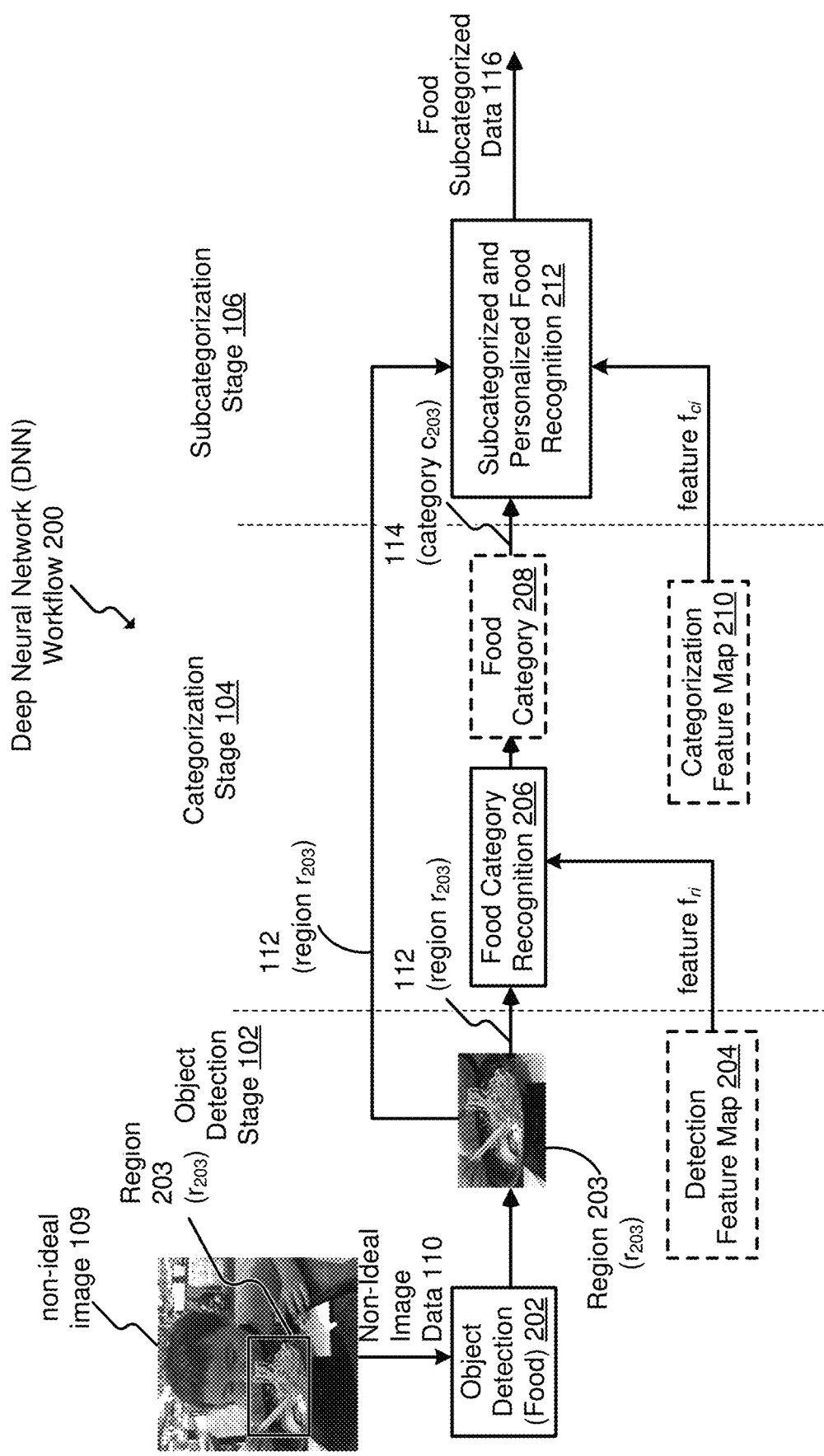
FIG. 2 is a workflow diagram of an embodiment of the DNN framework.

FIG. 2 is an example workflow 200 of an embodiment of the DNN framework 100 including an object detection stage 102, a categorization stage 104, and a subcategorization stage 106. The workflow 200 depicts the flow of tasks from one stage to another of the DNN framework 100.

Initially, the non-ideal image data 110 can be an actively acquired image 109 by a user device, such as an image captured with the handheld mobile device 128 of FIG. 1, or can be a passively acquired image 109 from an automatic imaging system, such as a frame captured by a drone, a surveillance camera, etc. In a food recognition context, the non-ideal image data 110 includes non-food related objects, such as a child, several general background elements, a table surface, eating utensils, etc.

In operation, the object detection stage 102 of the DNN framework 100 performs object detection (food) 202 on the non-ideal image data 110 from the image 109 to detect one or many food items within the non-ideal image data 110, such as a beverage, a dessert, side salad, etc. Correspondingly, the non-ideal image data 110 can include one or many defined regions r based on a number of food items that may be detected.

When there is one defined region of food, the detected object data 112 includes a region $r_1$. When there are many defined regions r, the resulting regions for the non-ideal image data 110 may include regions $r_1 \ldots r_n$. For clarity, the example of FIG. 2 describes an image 109 having a singular food item for recognition, such as a noodle bowl.

Each region r of the non-ideal image data 110 containing one of the detected food items is designated as a detected food region using designations $r_1 \ldots r_n$. Each region r can be defined by a bounding box, a detailed contour, a segmentation heat map, etc. In the example of the non-ideal image data 110, the object detection (food) 202 receives the non-ideal image data 110 and produces detected object data 112. The detected object data 112 identifies a probable food item such as noodles identified as a detected food region 203. Detected food region 203 may also be referred to as region 203 or region $r_{203}$.

In an embodiment, the workflow 200 can produce a detection feature map 204 (feature $f_{ri}$) for each region 203 of food items defined within the non-ideal image data 110. In an embodiment, the detection feature map 204 may be the convolutional product of the non-ideal image data 110 and a filter, as discussed in detail above with regard to FIG. 1. As an example, the non-ideal image data 110 is viewed through a smaller "window" or filter that can move up, down, across, etc. to determine features from the non-ideal image data 110, such as a curve of the noodle bowl or other serving dishes, the outlines of the noodles or of a food item, etc. These features, the convolved solution of the non-ideal image data 110, are stored in the detection feature map 204 relating to detection of a food item. As may be appreciated, the filter is trained by ideal images of food items, as discussed above with regard to FIG. 1. The combination of features leads to the probability that an area of the non-ideal image data 110 includes larger, more complex food features.

The categorization stage 104 includes food category recognition 206. The food category recognition 206 receives detected object data 112 from object detection 202 and detection feature map 204 as feature $f_{ri}$ of the region $r_{203}$. A convolution filter of the food category recognition 206 is pre-trained to recognize a set of pre-defined food categories including those commonly consumed in geographic-designated residences or institutions. From the detected object data 112 and the detection feature map 204, the food category recognition 206 generates categorized objected data 114 having a food category 208, which may be based on the defined region $r_{203}$ of the detected object data 112. Food categories can include categories such as pizza, omelet, chicken wings, noodles, spaghetti, etc. on a probability basis.

The food category recognition 206 generates a categorization feature map 210 (also referred to as feature $f_{ci}$) relating to the convolution of the detected object data 112 with categorization filter.

In an embodiment, the categorization feature map 210 may be the convolutional product of the detected object data 112 and a convolution filter, as discussed in detail above with regard to FIG. 1. As an example, the detected object data 112 and the detected object data 112 can serve as an index to subcategory-related convolutional filters of the subcategorization sage 106. The convolutional sub-category filters can be referred to as a smaller "window," relative to the categorization feature map 210, to determine finer food features, such as specifics relating to the food object, such as lines related to the noodles, spacing of the noodle lines indicative of noodle width, noodle type, the lines indicative of a level of a broth, opaqueness of the broth, etc. These features, based on the convolved solution of the categorization feature map 210, can be stored as the categorization feature map 210 relating to detection of a food category, such as a "noodle" category. As may be appreciated, the convolutional filter of the food category recognition 206 can be trained by non-ideal or non-staged images of food subcategories, such as a soba noodle soup subcategory, a rice noodle soup category, a pho noodle soup category, etc., as discussed in detail above with regard to FIG. 1.

When the DNN framework 100 may be deployed to a non-ideal environment, such as a residence, convolutional filter parameters of the subcategorization stage 106 may be fine-tuned using data relating to that specific residence or institution to better accommodate fine-granular recognition conditions in the non-ideal environment.

The detected food region $r_i$, such as region $r_{203}$, the categorization feature map 210 output feature $f_{ci}$, and the localized training data 125 are input into a subcategorized and personalized food recognition 212 of the subcategorization stage 106 to produce food subcategorized data 116. The food subcategorized data 116 may be used, for example, for retrieval of nutritional assessment of the identified item for monitoring that nutritional and caloric needs of a person are being met in a non-ideal environment such as a home environment with home-prepared meals.

Figure 3:
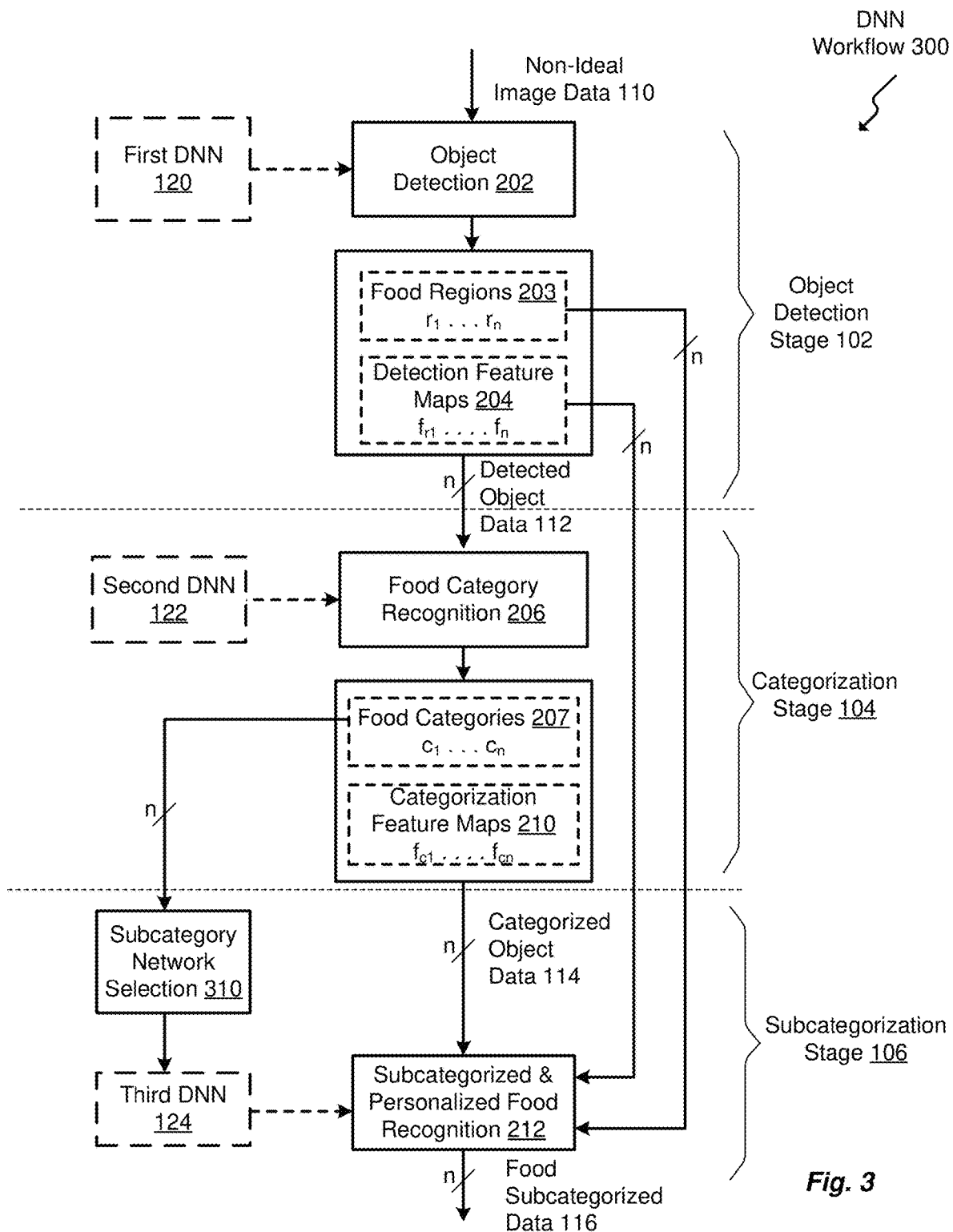
FIG. 3 illustrates another workflow diagram of an embodiment of the DNN framework.

FIG. 3 illustrates another example workflow 300 of an embodiment of the DNN framework 100 relating to multiple object detection from the non-ideal image data 110. In this example, multiple food items may be present in the non-ideal image data 110, such as multiple dishes, a dish with multiple items such as a beverage, a dessert, side salad, etc.

The object detection stage 102 includes the object detection 202, which is powered by the first DNN 120. As noted earlier, the non-ideal image data 110 can be an actively acquired image 109 by a user device, such as an image captured with a handheld mobile device 128, or can be passively acquired image 109 from an automatic imaging system, such as a frame captured by a drone, a surveillance camera, etc.

In a food recognition context, the non-ideal image data 110 may include non-food related objects, such as a child, several general background elements, a table surface, eating utensils, etc. When multiple food items may be present in the non-ideal image data 110, such as multiple dishes with entrées, side dishes, desserts, etc., or a single dish with multiple items such as a beverage, a dessert, side salad, etc., the object detection 202 produces a corresponding regions $r_1 \ldots r_n$, where the value n is an integer correlating with the number of identified food items. Each region $r1 \ldots r_n$ can be defined by a bounding box, a detailed contour, a segmentation heat map, etc. The object detection 202 also produces a plurality of detection feature maps 204 $f_{r1} \ldots f_n$. As discussed in detail earlier, a feature map is a convolutional result of all spatial locations of the non-ideal image data 110. The feature map indicates the portions of the non-ideal image data 110 providing indications of probable objects based on detection of edges, colors, textures, etc.

Also, the DNN framework 100 can produce a detection feature map 204 (feature $f_{ri}$) for each region 203 defined within the non-ideal image data 110.

The plurality of detected object data 112 is provided to the categorization stage 104 that include a food category recognition 206, which is powered by the second DNN 122. Convolutional filters of the second DNN 122 are pre-trained to recognize pre-defined food categories from the regions $r_1 \ldots r_n$ output by the food detection localization 202, including common food types of geographic-designated residences or institution. The food category recognition 206 receives the plurality of detected object data 112, which may include the food region 203 including regions $r_1 \ldots r_n$, and detection feature map 204, including maps $f_{r1} \ldots f_n$. The food category recognition 206 produces a plurality of food categories 207, designated as $c_1 \ldots c_n$, such as, for example, a "pizza" category, an "omelet" category, a "poultry" category, etc., corresponding to the detected food item of the object detection stage 102. Categorization feature maps 210, designated as $f_{c1} \ldots f_{cn}$, are also generated from the plurality of food regions 203 and the corresponding plurality of detection feature maps 204 from the object detection stage 102.

The subcategorization stage 106 includes a subcategorized and personalized food recognition 212 powered by the third DNN 124. The subcategorized and categorized food recognition 212 receives the plurality of categorized object data 114. The plurality of categorized object data 114 can include the plurality of food categories 207 designated as $c_1 \ldots c_n$ and categorization feature maps 210 designated as $f_{c1} \ldots f_{cn}$. The subcategorized and personalized food recognition 212 also receives the food regions 203 and detection feature maps 204 of the object detection stage 102. With the combination of stage inputs, the subcategorized and personalized food recognition 212 produces the plurality of food subcategorized data 116. As may be appreciated, the third DNN 124 may sequentially progress through the food categories 207 of $c_1 \ldots c_n$ by the subcategory network selection 310, which receives the food categories 207 of $c_1 \ldots c_n$ and sequentially drives the third DNN 124, which powers the subcategorized and personalized food recognition 212 to produce the plurality of food subcategorized data 116.

As may also be appreciated, the subcategory network selection 310 may generate a set of subcategory networks of the third DNN 124 to provide a plurality of DNNs corresponding to each of the plurality of categorized object data 114. For example, when "pizza" is a category identified by the categorization stage 104, the subcategorization stage 106 can be a corresponding DNN with a designation of $N_{pizza}$. An $N_{pizza}$ DNN can operate to distinguish subcategories of pizza within category $c_{pizza}$. The subcategory networks, or subcategorization stage 106 can also include several DNNs $N_{cr1}, \ldots, N_{crk}$ that each correspond to multiple categories of the categorization stage 104. In the example of a food context, the multiple categories $r_{c1}, \ldots, r_{ck}$ may be closely related in appearance to a recognized food category $c_i$. For a further example, pizza, flat bread, and Korean pancake may appear similar in appearance, though they are different food categories. The relationship of different food categories at the categorization stage 104 can be computed based on a confusion matrix algorithm, based on an annotated recipe, etc., as discussed earlier above.

As may be appreciated, in the field of machine learning and statistical classification, a confusion matrix is a specific table layout that allows visualization of the performance of a DNN. Each row of the confusion matrix represents the number of instances in a predicted class, while each column represents the instances in an actual class. The term "confusion matrix" stems from the use of the tool to determine whether a DNN confuses categories by mislabeling one category improperly as another.

The detected food region $r_i$, such as region $r_{203}$, and the categorization feature map 210 output feature $f_{ci}$ are input into a subcategorized and personalized food recognition 212 of the subcategorization stage 106 to produce food subcategorized data 116.

FIGS. 4 and 5 illustrate functional operation of an embodiment of a subcategorization stage 106 of the DNN framework 100. In an embodiment, FIG. 4 illustrates data inputs 401 from previous DNN stages, food subcategory DNNs 402, and fusion 404 to produce food subcategorized data 116.

The data inputs 401 includes food regions 203, designated as $r_1, \ldots, r_n$, detection feature maps 204, designated as $f_{r1}, \ldots, f_m$, and categorization feature maps 210, designated as $f_{c1}, \ldots, f_{cn}$. The data inputs 401 are received by a plurality of food subcategory DNNs 402, which include convolutional layers to receive respective food regions 203, detection feature maps 204 from the object detection stage 102, and categorization feature maps 210 from the categorization stage 104. As discussed, each successive stage of the DNN framework 100 may be progressively granular, or progressing from a coarse-level recognition of a food item, to a mid-level recognition of the food item, such as pizza, noodles, soup, drink, vegetable, etc.

Specifically, the food regions 203, designated as $r_1, \ldots, r_n$, for example, the region 203 containing the detected food item, the detection feature maps 204, and the categorization feature maps 210 are input to food subcategory DNN 402-01, 402-02 through 402-$k$, and through fusion 404, to produce food subcategorized data 116.

Referring to FIG. 5, shown is an embodiment of a feedforward computation structure 500 of the subcategorization stage 106 for generating feature vectors. The term vector is understood to be a quantity having a direction and a weight so as to determine the position of a point in space relative to another. In image recognition, vectors aid in the machine learning and identification of objects from non-ideal image data. The feedforward computation structure 500 includes data inputs 501, trainable food subcategory DNNs 502, and resulting feature vectors 504 relating to data inputs 501.

In an embodiment, the data inputs 501 the sub-network layers $S_{r-ci}$, $S_{fr-ci}$ and $S_{fc-ci}$ to generate respective feature vectors $V_{r-ci}$, $V_{fr-ci}$, and $V_{fc-ci}$. Then these feature vectors are combined through fusion process 404 to generate the food subcategorized data 116.

In an embodiment, the vectors can be directly concatenated into a long vector and a shallow classifier by, for example, a support vector machine (SVM) or K nearest neighbor algorithm, which are supervised learning models with associated learning algorithms to analyze data for classification and regression analysis. These structures can be trained to a localized and/or non-ideal environment based on the long vector to classify subcategory foods.

In another embodiment, a shallow classifier can be trained to a localized and/or non-ideal environment based on each vector and the output of the classifier can be combined, such as by a weighted combination of the probabilities that the food item is a subcategory food being predictable by different vectors. The sub-categories 402 can include a set of convolutional layers, the outputs of which are fused through fusion 404 to produce food subcategorized data 116.

Figure 6:
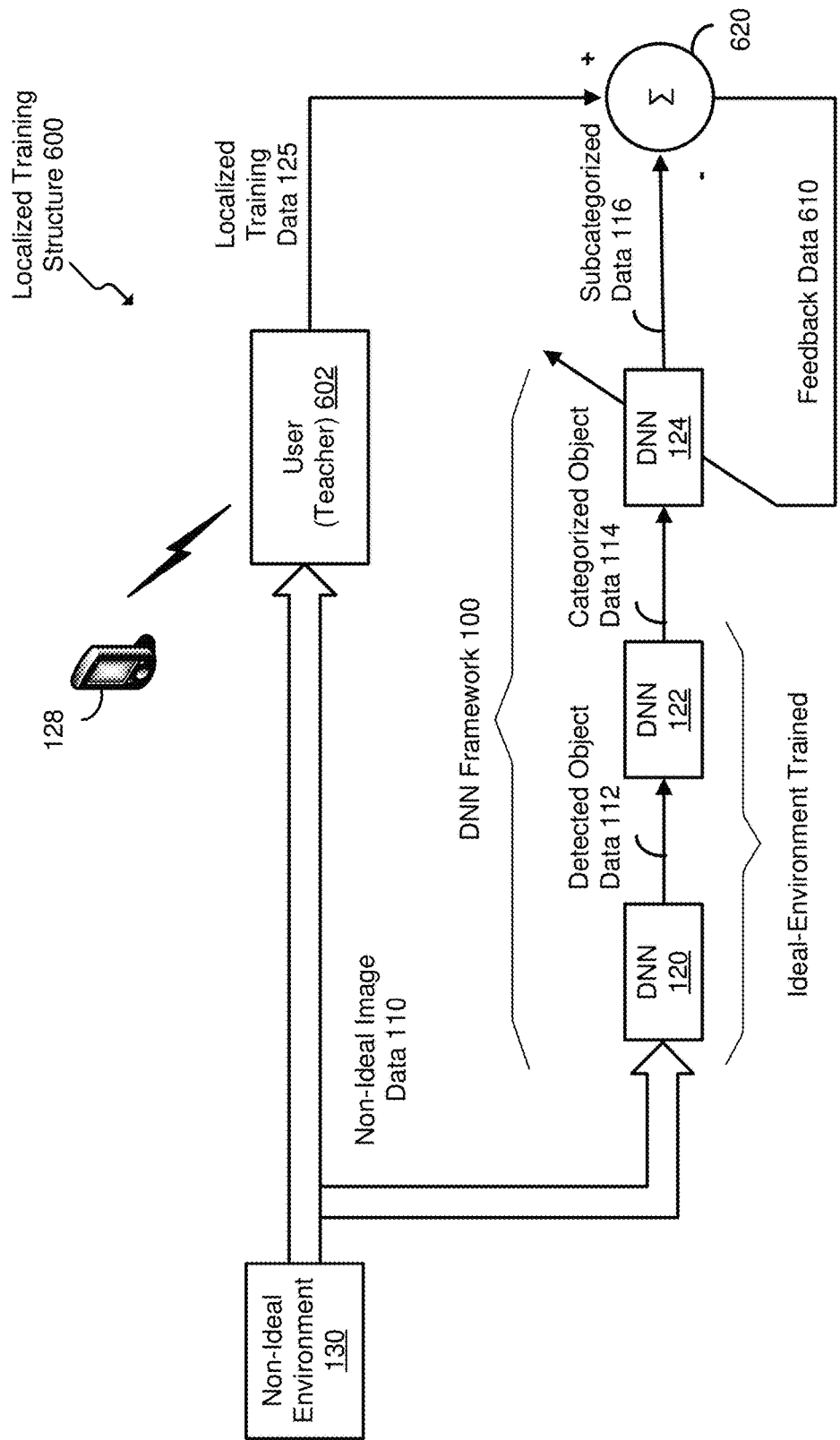
FIG. 6 illustrates an example localized training structure for the subcategorization stage of the DNN framework.

FIG. 6 illustrates an example localized training structure 600 for the subcategorization stage 106 of the DNN framework 100 when the subcategorized data 116 is invalid. For example, when the subcategorized data 116 fails to accurately identify a food object with respect to the localized training data 125, and the sum 620 does not produce a "no difference" result, or a result within a predetermined error tolerance, such as the item was correctly identified but not the portion size, the subcategorized data 116 is invalid.

The localized training structure 600 includes user (teacher) 602, a sum 620, and DNN framework 100. The user (teacher) 602 produces localized training data 125 being compared to a subcategorized data 116 output by the third DNN 124 to produce feedback data 610 for training the third DNN 124 to a non-ideal environment condition.

When deployed to a non-ideal environment 601, network parameters can be fine-tuned using data relating to that specific residence or institution to better accommodate fine-granular recognition conditions in the environment.

There are various ways to acquire new data for fine-tuning the DNN 124, such as through a handheld mobile device 128 of the user. For example, an application executing on a handheld mobile device can receive Actor-Critic feedback that rates how well the DNN framework identified the object, as well as requesting the user to provide descriptors or identifiers to improve object identification, etc.

New data for fine-tuning the network can be obtained through a handheld mobile device of the user. For example, an application executing on a handheld mobile device can receive an Actor-Critic feedback rating how well the object was identified by the DNN framework 100. For example, the application can be queried to the accuracy of the food subcategorized data 116. The query may prompt the user to provide descriptors or identifiers for the item if an invalid or unsatisfactory result occurs in the subcategorized data 116. Also, SVM or K nearest neighbor algorithms may be implemented to train the third DNN 124.

When the subcategorized data 116 is invalid, the user (teacher) 602 may be prompted for input as to the identification goal for the subcategorized data 116. Generally, a user 602 has knowledge of the non-ideal environment 130 represented by the non-ideal image data 110 that the user 602 can reduce to localized training data 125 through a set of input-output samples such as by the handheld mobile device 128, which provides a user interface to provide an external teacher in relation to the DNN 124. Examples of input-output samples can include queries to the user via an executable application to provide a graphical user interface (GUI) survey form for an ingredient/composition of a food item of the non-ideal image data 110, food setting whether in a plate, a bowl, a side dish, etc., local lighting, orientation with respect to the camera, location datum of the object, annotated recipe information input, local ingredient inventory data, geographic region data, cultural trends data, etc.

The training of the third DNN 124 of the subcategorization stage 106 may be considered as supervised or active learning based on an external teacher via a user interface such as that of the handheld mobile device 128, as well as sensor data accessible of the handheld mobile device 128 for ambient environment data. Ambient environment data can include ambient lighting data, which may indicate pre-filtering imaging that may boost the contrast for the non-ideal image, ambient humidity data as it may relate to lens distortion, the time-of-day data, which may relate to the nature of the food time. For example, when the time-of-day is early, the food item may be more likely to be a vegetable omelet rather than a vegetable pizza. When the non-ideal user environment 130 may be a residence or institution unknown to the third DNN 124, the user acts in a teacher role, providing the third DNN 124 with a desired or target response for a trainable food subcategory DNN 502.

A desired response by the third DNN 124, such as correctly identifying an object at a subcategorization level to produce subcategorized data 116, is an optimum action to be performed by the third DNN 124. Feature maps of the third DNN 124, or the convolutional output of the non-ideal image data 110 processed via a convolutional filter as discussed earlier, can be adjusted under the combined influence of the feedback data 610 produced by the sum 620 to the convolutional filter or sub-network layers of the trainable food subcategory DNNs 502 of FIG. 5. The combined influence is the difference between the actual response, or subcategorized data 116 of the third DNN 124 and the desired response represented by the localized training data 125. Adjustment to the third DNN 124 can be carried out iteratively with the goal of causing the third DNN 124 to emulate the user (teacher) 602.

When the third DNN 124 can emulate the user 602, the third DNN 124 can operate in a non-ideal environment 601 unsupervised.

Once consistent and desired performance of the third DNN 124 is accomplished, the structure can be "frozen," so that the third DNN 124 may operate in a static manner. In the alternative, with on-line learning applications relating to a non-ideal environment 601, the learning procedure can be implemented solely within the localized training structure 600. The learning may be accomplished in real-time, with the result that the third DNN 124 is dynamic.

Figure 7:
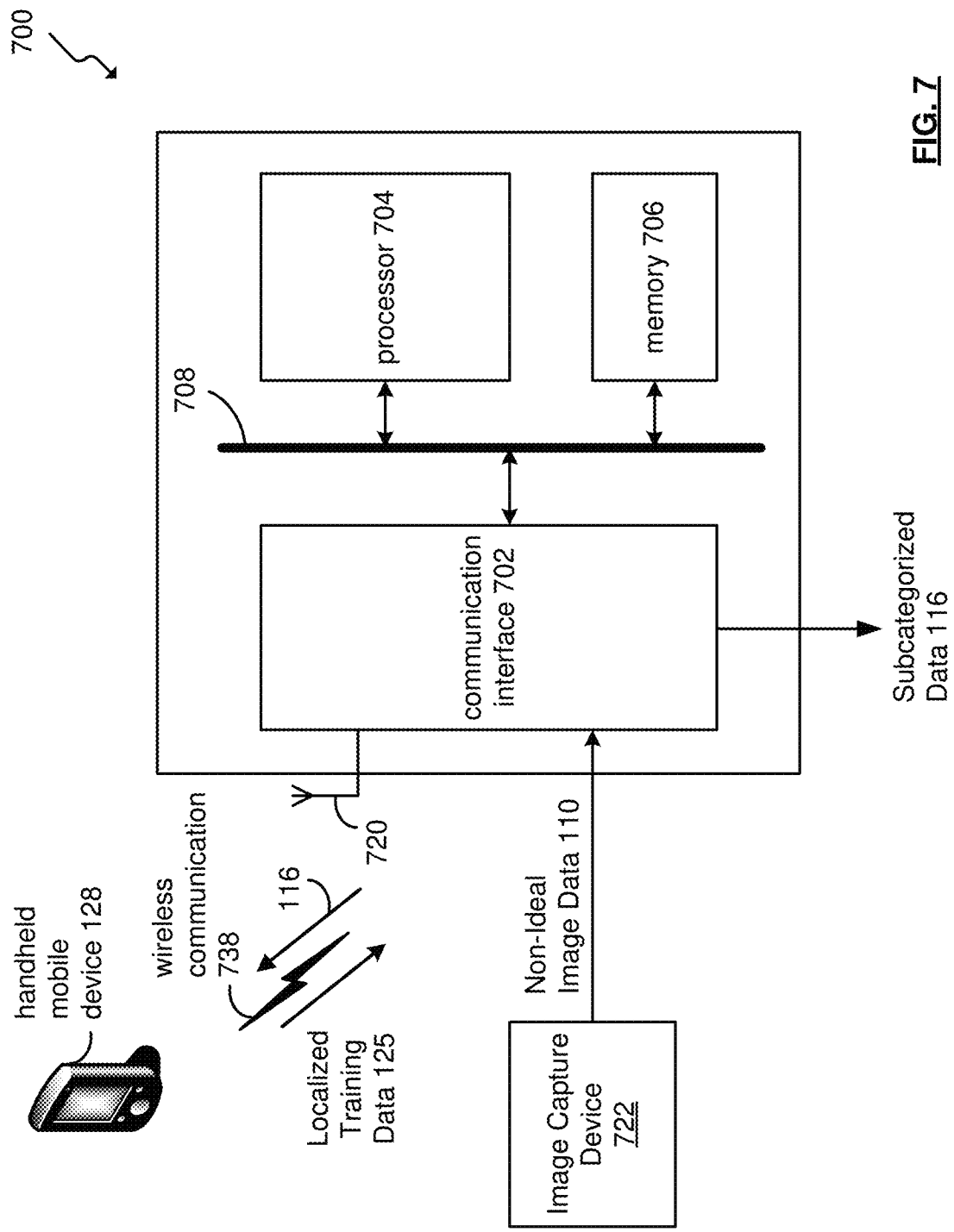
FIG. 7 is an example block diagram of a platform for the DDN framework.

FIG. 7 is a block diagram of a platform 700 for the DDN framework 100, which includes a communication interface 702, a processor 704, and memory 706, that are communicatively coupled via a bus 708.

The processor 704 can be a conventional central processing unit (CPU) or any other type of device, or multiple devices, capable of manipulating or processing information. As may be appreciated, processor 704 may be a single processing device or a plurality of processing devices. Such a processing device may be a microprocessor, micro-controller, digital signal processor, microcomputer, CPU, field programmable gate array (FPGA), programmable logic device, state machine, logic circuitry, analog circuitry, digital circuitry, and/or any device that manipulates signals (analog and/or digital) based on hard coding of the circuitry and/or operational instructions.

The memory and/or memory element 706 may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. The memory 706 is capable of storing machine readable instructions such that the machine readable instructions can be accessed by the processor 704. The machine readable instructions can comprise logic or algorithm(s) written in programming languages, and generations thereof, (e.g., 1GL, 2GL, 3GL, 4GL, or 5GL). Such as, for example, machine language that may be directly executed by the processor 704, or assembly language, object-oriented programming (OOP), scripting languages, microcode, etc., that may be compiled or assembled into machine readable instructions and stored on the memory 706. Alternatively, the machine readable instructions may be written in a hardware description language (HDL), such as logic implemented via either a FPGA configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 704 includes more than one processing device, the processing devices may be centrally located (e.g., directly coupled together via a wired and/or wireless bus structure) or may be distributively-located (e.g., cloud computing via indirect coupling via a local area network and/or a wide area network). Further note that when the processor 704 implements one or more of its functions via a state machine, analog circuitry, digital circuitry, and/or logic circuitry, the memory and/or memory element 706 storing the corresponding operational instructions may be embedded within, or external to, the circuitry comprising the state machine, analog circuitry, digital circuitry, and/or logic circuitry. Still further note that, the memory element 706 stores, and the processor 704 executes, hard coded and/or operational instructions corresponding to at least some of the steps and/or functions illustrated in FIGS. 1-9 to provide image recognition of objects of a non-ideal image data 110 and further refined to training data in the non-ideal environment 601.

The communication interface 702 generally governs and manages user input data via a handheld mobile device 128 over a wireless communication 738. The communication interface 702 also manages input data such as the non-ideal image data 110 from the image capture device 722. There is no restriction on the present disclosure operating on any particular hardware arrangement and therefore the basic features herein may be substituted, removed, added to, or otherwise modified for improved hardware and/or firmware arrangements as they may develop.

The antenna 720, with the communication interface 702, operates to provide wireless communications with the handheld mobile device 128, including wireless communication 738.

Such wireless communications range from national and/or international cellular telephone systems to the Internet to point-to-point in-home wireless networks to radio frequency identification (RFID) and/or near field communication (NFC) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

The structure of the DNN framework 100 may also be used as an acceptable architecture of the handheld mobile device 128, and/or other devices that may interact with the DNN framework 100.

The memory and/or memory element 706 for the DNN framework 100, for example, may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

Note that if the processor 704 for the DNN framework 100 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 704 may implement one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element 706 stores, and the processor 704 executes, hard coded and/or operational instructions corresponding to at least some of the steps and/or functions illustrated in FIGS. 1-9 to perform multi-stage image recognition based on a non-ideal image data and methods described herein.

There is no restriction on the present disclosure operating on any particular hardware arrangement and therefore the basic features herein may be substituted, removed, added to, or otherwise modified for improved hardware and/or firmware arrangements as they may develop.

Figure 8:
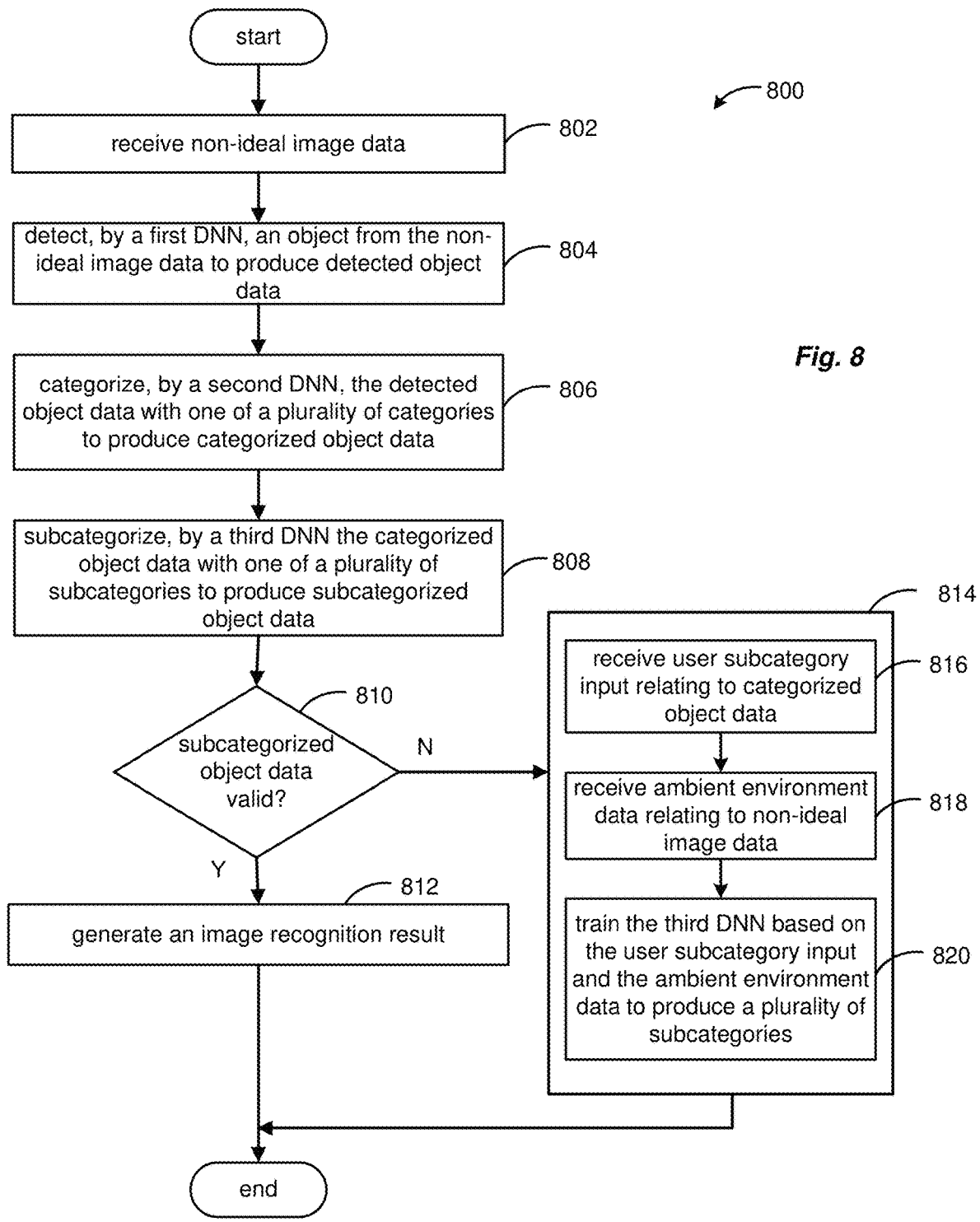
FIG. 8 is a flowchart illustrating an embodiment of a method for multi-stage image recognition.

FIG. 8 is a flowchart illustrating an embodiment of a method 800 for multi-stage image recognition. The method includes receiving at operation 802 non-ideal image data 110. The non-ideal image data may relate to the non-ideal environment in which the image data is captured, such as by a digital camera, a handheld mobile device, a surveillance device, an artificial intelligence device, etc. At operation 804, a first deep neural network detects an object from the non-ideal image data to produce detected object data. As may be appreciated, the object can include the class of items in which the multi-stage image recognition method is directed, such as food recognition, facial recognition, etc. A second deep neural network, at operation 806, categorizes the detected object data with one of a plurality of categories to produce categorized object data. For example, when the class of items for recognition is a food item, the second deep neural network may operate to classify the detected food items, as one of a "pizza," an "omelet," a "chicken" dish, etc.

At operation 808, a third deep neural network subcategorizes the categorized object data with one of a plurality of subcategories to produce subcategorized object data. At operation 810, when the subcategorized object data is valid, an image recognition result is generated at operation 812 at the third deep neural network. The validity confirmation may be from supervised learning of the method in a non-ideal environment, in which a user or teacher confirms, via a user interface, whether the multi-stage image recognition achieved the correct subcategorized data. For example, whether the detected object data ultimately is a "pizza," and if that pizza is a "vegetable" pizza. Other food items may appear similar, such as pizza slices, omelets, flat bread, Korean pancakes, etc. When the subcategorized object data is invalid at operation 810, the third deep neural network undergoes training with respect to operation 814.

In operation 814, training includes operation 816 in which user subcategory input is received relating to the non-ideal image data. For example, in a food item context, the user may provide input such as annotation data providing further sub-descriptors for the food item, such as "vegetable" pizza, being a "large" portion, being a "slice" of a whole pizza, etc. The descriptors may be provided to the user for entry to itemize the sub-descriptors. Additional information relating to the non-ideal environment can be in the form of ambient environment data at operation 818. For example, ambient environment data can include ambient lighting data, which may indicate pre-filtering imaging that may boost the contrast for the non-ideal image, ambient humidity data as it may relate to lens distortion, the time-of-day data, which may relate to the nature of the food time. For example, when the time-of-day is early, the food item may be more likely to be a vegetable omelet rather than a vegetable pizza. At operation 820, the third deep neural network is trained based on the user subcategory input and the ambient environment data to produce a plurality of subcategories.

Figure 9:
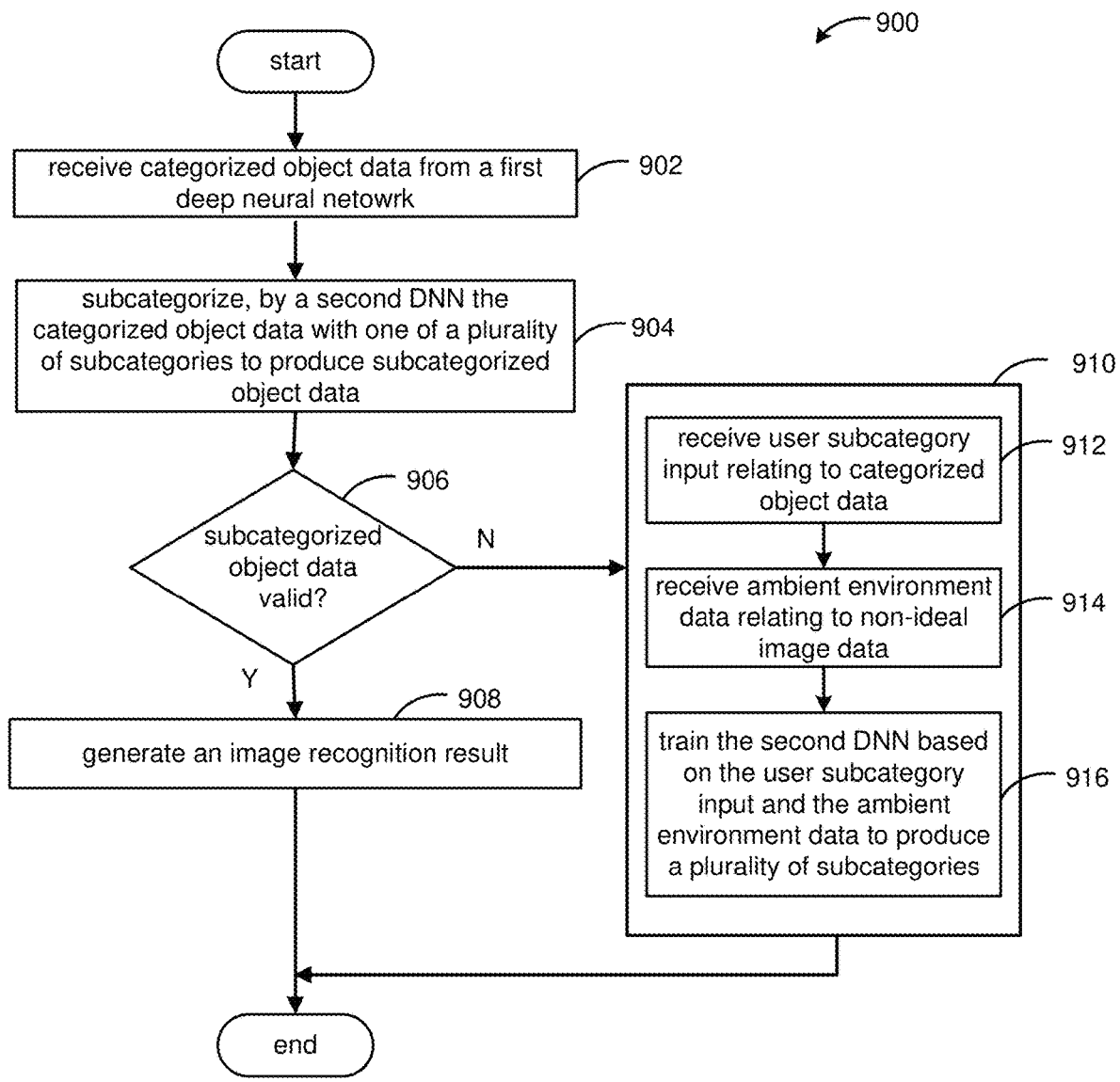
FIG. 9 is a flowchart illustrating another embodiment of a method for multi-stage image recognition.

FIG. 9 is a flowchart illustrating another embodiment of a method 900 for multi-stage image recognition. The method includes receiving at operation 902 categorized object data from a first deep neural network. The categorized object data can be based on non-ideal image data. The non-ideal image data may relate to the non-ideal environment in which the image data is captured, such as by a digital camera, a handheld mobile device, a surveillance device, an artificial intelligence device, etc. The categorized object data can relate to a class of items in which the multi-stage image recognition method is directed, such as food recognition, facial recognition, etc. For example, when the class of items for recognition is a food item, the second deep neural network may operate to classify the detected food items, as one of a "pizza," an "omelet," a "chicken" dish, etc.

At operation 904, a second deep neural network subcategorizes the categorized object data with one of a plurality of subcategories to produce subcategorized object data. At operation 906, when the subcategorized object data is valid, an image recognition result is generated at the third deep neural network at operation 908. The validity confirmation may be from supervised learning of the method in a non-ideal environment, in which a user or teacher confirms, via a user interface, whether the multi-stage image recognition achieved the correct subcategorized data. For example, whether the detected object data ultimately is a "pizza," and if that pizza is a "vegetable" pizza. Other food items may appear similar, such as pizza slices, omelets, flat bread, Korean pancakes, etc. When the subcategorized object data is invalid at operation 906, the third deep neural network undergoes training with respect to operation 910.

In operation 910, training includes operation 912 in which user subcategory input is received relating to the non-ideal image data. For example, in a food item context, the user may provide input such as annotation data providing further sub-descriptors for the food item, such as "vegetable" pizza, being a "large" portion, being a "slice" of a whole pizza, etc. The descriptors may be provided to the user for entry to itemize the sub-descriptors. Additional information relating to the non-ideal environment, is received as ambient environment data, at operation 914. For example, ambient environment data can include ambient lighting data, which may indicate pre-filtering imaging that may boost the contrast for the non-ideal image, ambient humidity data as it may relate to lens distortion, the time-of-day, etc. As an example, when the time-of-day is early, the food item may be more likely to be a vegetable omelet rather than a vegetable pizza. At operation 916, the second deep neural network is trained based on the user subcategory input and the ambient environment data to produce a plurality of subcategories.

A method of multi-stage image recognition includes means for receiving categorized object data from a first deep neural network, and means for training a second deep neural network based on subcategory customization data that relates to a personalized user environment when the second deep neural network does not produce valid subcategorized object data from the categorized object data for generating an image recognition result.

A method of image recognition includes means for receiving non-ideal image data, means for detecting, by a first deep neural network, an object from the non-ideal image data to produce detected object data, means for categorizing, by a second deep neural network, the detected object data with one of a plurality of categories to produce categorized object data, and means for training a third deep neural network based on subcategory customization data relating to a personalized user environment when the third deep neural network does not produce valid subcategorized object data from the categorized object data for generating an image recognition result.

An apparatus for multi-stage image recognition including a processor means and memory means coupled to the processor means, the memory means for storing instructions that, when executed, cause the processor means to receive categorized object data from a first deep neural network, and to train a second deep neural network based on subcategory customization data relating to a personalized user environment when the second deep neural network does not produce valid subcategorized object data from the categorized object data for generating an image recognition result.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of multi-stage food image recognition, the method comprising:
    training a first deep neural network to produce detected object data from non-ideal image data, the detected object data comprising detected region data and detected feature data, the detected region data indicating a region of the non-ideal image data containing a food object, and the detected feature data indicating detected features of the food object;
    training a second deep neural network to produce categorized object data based on the detected object data, the categorized object data comprising a food category data and categorization feature data, the food category data indicating a food category in which the food object belongs, the categorization feature data indicating categorization features of the food object that identifies the food object as belonging in the food category;
    training a third deep neural network in food subcategories of the food category in which the food object belongs; and generating an image recognition result of the food object using the third deep neural network based on the categorized object data,
    wherein training the third deep neural network in the food subcategories of the food category comprises: receiving user subcategory input relating to the categorized object data; receiving ambient environment data relating to non-ideal image data; and training the third deep neural network based on the user subcategory input and the ambient environment data,
    wherein the ambient environment data comprises at least one of: ambient lighting data; ambient humidity data; and time-of-day data.

2. The method of claim 1, wherein the first deep neural network is trained on stock food image data.

3. The method of claim 1, further comprising training a plurality of third deep neural networks, each trained in unique food subcategories of a plurality of food categories.

4. The method of claim 1, wherein the categorized object data is based on the non-ideal image data from at least one of:
    a digital camera;
    a handheld mobile device;
    a surveillance device; and
    an artificial intelligence device.

5. A method of image recognition comprising: receiving non-ideal image data;
    detecting, by a first deep neural network, a food object from the non-ideal image data to produce detected object data, the detected object data comprising detected region data and detected feature data, the detected region data indicating a region of the non-ideal image data containing the food object, the detected feature data indicating detected features of the food object;
    inputting the detected object data to a second deep neural network; categorizing, by the second deep neural network, the food object from the detected object data to produce categorized object data, the categorized object data comprising category data and categorization feature data, the category data indicating a food category in which the food object belongs, the categorization feature data indicating categorization features of the food object that identifies the food object as belonging in the food category;
    selecting a third deep neural network from a plurality of deep neural networks, the third deep neural network trained in food subcategories of the food category in which the food object belongs by:
    receiving user subcategory input relating to the non-ideal image data;
    receiving ambient environment data relating to the non-ideal image data; and
    training the third deep neural network in the food subcategories of the food category based the user subcategory input and the ambient environment data,
    wherein the ambient environment data comprises at least one of: ambient lighting data; ambient humidity data; and time-of-day data;
    inputting the categorized object data to the third deep neural network; and
    subcategorizing, by the third deep neural network, the food object based on the categorized object data to produce subcategorized data that indicates a food subcategory of the food category in which the food object belongs.

6. The method of claim 5, wherein the first deep neural network and the second deep neural network are trained on stock image data.

7. The method of claim 5 further
    comprising generating an image recognition result based on the subcategorized data.

8. The method of claim 5, wherein the food category is selected from a plurality of coarse-grained food categories, and the food subcategory is selected from a plurality of fine-grained food subcategories that enables fine-grained food identification of the food object.

9. The method of claim 5, wherein the categorized object data is based on the non-ideal image data from at least one of:
- a digital camera;
- a handheld mobile device;
- a surveillance device; and
- an artificial intelligence device.

10. Apparatus for multi-stage food image recognition, the apparatus comprising:
- a processor; and
- memory coupled to the processor, the memory for storing instructions that, when executed, cause the apparatus to: generate detected object data using a first deep neural network, the detected object data comprising detected region data and detected feature data, the detected region data indicating a region of a non-ideal image data containing a food object, the detected feature data indicating detected features of the food object;
- generate categorized object data using a second deep neural network, the categorized object data comprising category data and categorization feature data, the category data indicating a food category from a plurality of food categories in which the object belongs, the categorization feature data indicating categorization features of the food object that identifies the food object as belonging in the food category;
- select a third deep neural network from a plurality of deep neural networks, the third deep neural network trained in food subcategories of the food category in which the food object belongs by:
  - receiving user subcategory input relating to the non-ideal image data;
  - receiving ambient environment data relating to the non-ideal image data; and
  - training the third deep neural network based on the user subcategory input and the ambient environment data, wherein the ambient environment data comprises at least one of: ambient lighting data; ambient humidity data; and time-of-day data;
- inputting the categorized object data to the third deep neural network; and
- generate subcategorized data using the third deep neural network, the subcategorized data indicating a food subcategory of the food category in which the object belongs.

11. The apparatus of claim 10, wherein the first deep neural network is trained on stock food image data.

12. The apparatus of claim 10, wherein the memory stores further instructions that, when executed, cause the apparatus to:
- produce an image recognition result based on the subcategorized data.

13. The apparatus of claim 10, wherein the categorized object data is based on the non-ideal image data from at least one of:
- a digital camera;
- a handheld mobile device;
- a surveillance device; and
- an artificial intelligence device.

* * * * *